United States Patent
Atsuchi et al.

(10) Patent No.: US 7,845,446 B2
(45) Date of Patent: Dec. 7, 2010

(54) SCOOTER TYPE VEHICLE

(75) Inventors: Michio Atsuchi, Saitama (JP);
Sadamichi Enjo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 12/036,871

(22) Filed: Feb. 25, 2008

(65) Prior Publication Data

US 2008/0202836 A1 Aug. 28, 2008

(30) Foreign Application Priority Data

Feb. 28, 2007 (JP) .............................. 2007-049685

(51) Int. Cl.
*B60K 11/04* (2006.01)
*B62D 61/02* (2006.01)

(52) U.S. Cl. ...................... 180/68.4; 180/68.6; 180/229

(58) Field of Classification Search ............... 180/68.4, 180/68.6, 229
See application file for complete search history.

(56) References Cited

U.S. PATENT DOCUMENTS

| 4,564,081 A * | 1/1986 | Hamane et al. ............. 180/229 |
| 4,570,740 A * | 2/1986 | Hara .......................... 180/229 |
| 4,582,158 A * | 4/1986 | Hamane ..................... 180/229 |
| 7,387,180 B2 * | 6/2008 | Konno et al. ............... 180/68.3 |
| 7,389,840 B2 * | 6/2008 | Makuta et al. ........... 180/65.31 |
| 2005/0155804 A1 | 7/2005 | Kamemizu et al. |
| 2005/0200156 A1 * | 9/2005 | Michisaka et al. ....... 296/97.22 |

FOREIGN PATENT DOCUMENTS

| EP | 0755819 A1 | 1/1997 |
| EP | 1275830 A2 | 1/2003 |
| JP | 8-127377 A | 5/1996 |
| JP | 2001-63657 A | 3/2001 |

* cited by examiner

*Primary Examiner*—J. Allen Shriver, II
*Assistant Examiner*—John R Olszewski
(74) *Attorney, Agent, or Firm*—Birch, Stewart, Kolasch & Birch, LLP

(57) ABSTRACT

A scooter vehicle includes a steering handlebar, a radiator disposed under a seat, a step floor disposed between the steering handlebar and the seat, and a leg shield disposed forward of the step floor. The leg shield includes an upper portion protruding toward a rider side which includes a stuff box portion that shields the legs of the rider. The leg shield also is provided with an opening portion serving as a feed-water port for the radiator. The opening portion is covered by a cover member extending along a tunnel portion of the step floor in a back and forth direction of a vehicle body. The resulting configuration reduces the length of a feed-water pipe, thereby enhancing the ability to perform maintenance of the radiator.

20 Claims, 9 Drawing Sheets

SCOOTER TYPE VEHICLE

CROSS-REFERENCE TO RELATED APPLICATION

The present application claims priority under 35 U.S.C. §119 to Japanese Patent Application No. 2007-049685, filed Feb. 28, 2007, the entire contents of which are hereby incorporated by reference.

BACKGROUND OF THE INVENTION

1. Field of the Invention

The present invention relates to an improvement in a scooter type vehicle provided with a radiator for cooling the cooling water of a water-cooled engine.

2. Description of Background Art

There is known a scooter type vehicle that includes a radiator for cooling the cooling water of a water-cooled engine and a leg shield which has an upper portion protruding toward the rider side and shields the legs of a rider, the upper portion including a stuff box, in which the stuff box is removed to feed cooling water into the radiator (e.g., Japanese Patent Laid-open No. 2001-63657 (FIGS. 4 and 11).

FIG. 4 of Japanese Patent Laid-open No. 2001-63657 is a view for assistance in explaining a vehicle body cover around a meter panel. An opening portion 13*f* is disposed on the rear surface of a leg shied 13 and a right-hand stuff box 35 is detachably attached to the opening portion 13*f.*

FIG. 11 of Japanese Patent Laid-open No. 2001-63657 is a cross-sectional view taken along line XI-XI of FIG. 4.

The right-hand stuff box 35 is formed by integrally joining a box bottom portion 35*a* with a right lid portion 35*b*. In addition, the right-hand stuff box 35 is provided in the opening portion 13*f* of the leg shield 13 so as to be openable/closable and detachable via a pin 35*d*. A feed-water cap 37 of the radiator is disposed below the box bottom portion 35*a*, thereby enabling maintenance such as feeding water into the radiator and the like.

However, since the feed-water pipe for the radiator is installed to extend to the position of the right-hand stuff box 35, the water-feed pipe is likely to be increased in length, increasing cost. In addition, during maintenance of the radiator, the stuff box has to be removed. If articles are stored in the stuff box, they need to be taken out of the stuff box, which is a cumbersome operation.

SUMMARY AND OBJECTS OF THE INVENTION

It is an object of the present invention to provide a scooter type vehicle that reduces the length of a feed-water pipe and enhances the maintenance performance for a radiator.

According to an embodiment o the present invention, a scooter vehicle includes a radiator disposed below and between a steering handlebar steered by a rider and a seat on which the rider sits. The radiator is adapted to cool the cooling water for a water-cooled engine. A step floor on which the rider's feet are placed is disposed between the steering handlebar and the seat. A leg shield is disposed forward of the step floor. The leg shield has an upper portion protruding toward the rider side. The leg shield also includes a stuff box which shields the legs of the rider sitting on the seat. The step floor includes a pair of left and right foot placing portion on which the rider's feet are placed, and left and right lateral wall portions extending upwardly from the left and right foot placing portions.

A tunnel portion is formed to protrude upward by left and right lateral wall portions of the step floor, and the left and right lateral wall portions connected to left and right sides of an upper wall of the leg shield. One of the lateral wall portions of the step floor, or a portion of the leg shield joined to the one of the lateral wall portions, is provided with an opening portion. The opening portion is disposed below the stuff box. A feed-water nozzle is connected to the radiator via a feed-water pipe and is adapted to feed water to the radiator is disposed to face the opening portion.

According to an embodiment of the present invention, the opening portion is covered by a cover member extending along the tunnel portion in the back and forth direction of a vehicle body.

According to an embodiment of the present invention, a lid member is detachably attached to the feed-water nozzle and can be taken out to the outside of the cover member through the opening portion.

According to an embodiment of the present invention, the opening portion is disposed, of the left and right sides of the vehicle, on a side where the feed-water pipe is connected to the radiator.

According to an embodiment of the present invention, a side stand is provided and the opening portion is disposed on a side where the side stand is provided.

According to an embodiment of the present invention, a fuel tank is provided rearward of the radiator, a fuel tank cover is provided for the fuel tank, a hose is provided to connect the feed-water nozzle with a reservoir tank for storing cooling water for an engine mounted on the vehicle body, and the hose is supported by the fuel tank cover.

According to an embodiment of the present invention, the reservoir tank is disposed on a side different from the side of the feed-water nozzle, the hose is supported by the fuel tank cover at a plurality of positions in a vehicle-width direction and a curvature radius of the hose is increased by allowing a support portion close to the feed-water portion to be offset upward or downward from the other support portions.

According to an embodiment of the present invention, the cover member also serves as a maintenance lid for the engine.

Effects of the invention include the following:

According to the embodiment of the present invention, one of the lateral wall portions, or a portion joined to one of the lateral wall portions and disposed below the stuff box, is provided with the opening portion and the feed-water nozzle for the radiator is disposed to face the opening portion.

Since the feed-water nozzle for the radiator is made to face the opening portion, feeding water can be enabled without removal of the stuff box. Feeding water to the radiator can easily be carried out compared with the case where feeding water is carried out after removal of the stuff box. Thus, maintenance performance for the radiator can be enhanced.

In addition, the lateral wall portion of the step floor or a portion joined to the lateral wall portion and disposed below the stuff box is provided with the opening portion; it is not necessary to extend the feed-water pipe for the radiator to the position of the stuff box provided at the upper portion of the leg shield. Since it is not necessary to extend the feed-water pipe for the radiator to the upper portion of the leg shield, the length of the feed-water pipe can be reduced while effectively utilizing the dead space of the vehicle.

According to the embodiment of the present invention, since the opening portion is covered by the cover member extending along the tunnel portion in the back and forth direction of a vehicle body, it is possible to suppress degradation of the external appearance of the vehicle resulting otherwise from the opening portion.

According to the embodiment of the present invention, the lid member is detachably attached so as to be able to be taken out to the outside of the cover member through the opening portion. When water is fed, the lid member can be taken out to the outside of the cover member; therefore, feeding-water operation to the radiator can further easily be carried out.

According to the embodiment of the present invention, the opening portion is disposed on the side where the feed-water pipe is connected to the radiator; therefore, the length of the feed-water pipe can further be reduced compared with the case where the opening portion is provided at the other places.

According to the embodiment of the present invention, the side stand is provided and the opening portion is disposed on the side where the side stand is provided. If water is fed with the vehicle inclined to the side of the side stand by use of the side stand, the feed-water nozzle can be viewed from the oblique upside. This makes it easy to visibly recognize the feed-water nozzle, further enhancing the maintenance performance for the radiator.

The scooter type vehicle is provided with the side stand and the opening portion is disposed on the side where the side stand is disposed. If water is fed with the vehicle inclined to the side of the side stand by use of the side stand, the feed-water nozzle can be viewed from the oblique upside. Thus, it can be made easy to visibly recognize the feed-water nozzle, further enhancing the maintenance performance for the radiator.

According to the embodiment of the present invention, the hose is provided rearward of the radiator to connect the feed-water nozzle with the reservoir tank and the hose is supported by the fuel tank cover. Therefore, a dedicated support member can be eliminated. Since the dedicated support member can be eliminated, an increase in number of component parts can be suppressed.

In addition, the fuel tank cover is provided for the fuel tank and the hose can be supported at preferable positions of the fuel tank cover. Thus, the flexibility of layout of the hose between the feed-water nozzle and the reservoir tank can be enhanced.

According to the embodiment of the present invention, the curvature radius of the hose is increased by allowing a support portion close to the feed-water portion, of the plurality of support portions, to be offset upward or downward from the other support portions. The increased curvature radius of the hose can make it difficult to apply a strong force to the hose, which reduces a load exerted on the hose, thereby enhancing the durability of the hose.

According to the embodiment of the present invention, since the cover member also serves as a maintenance lid for the engine, a dedicated maintenance lid can be eliminated. Since the dedicated maintenance lid is eliminated, an increase in number of component parts can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
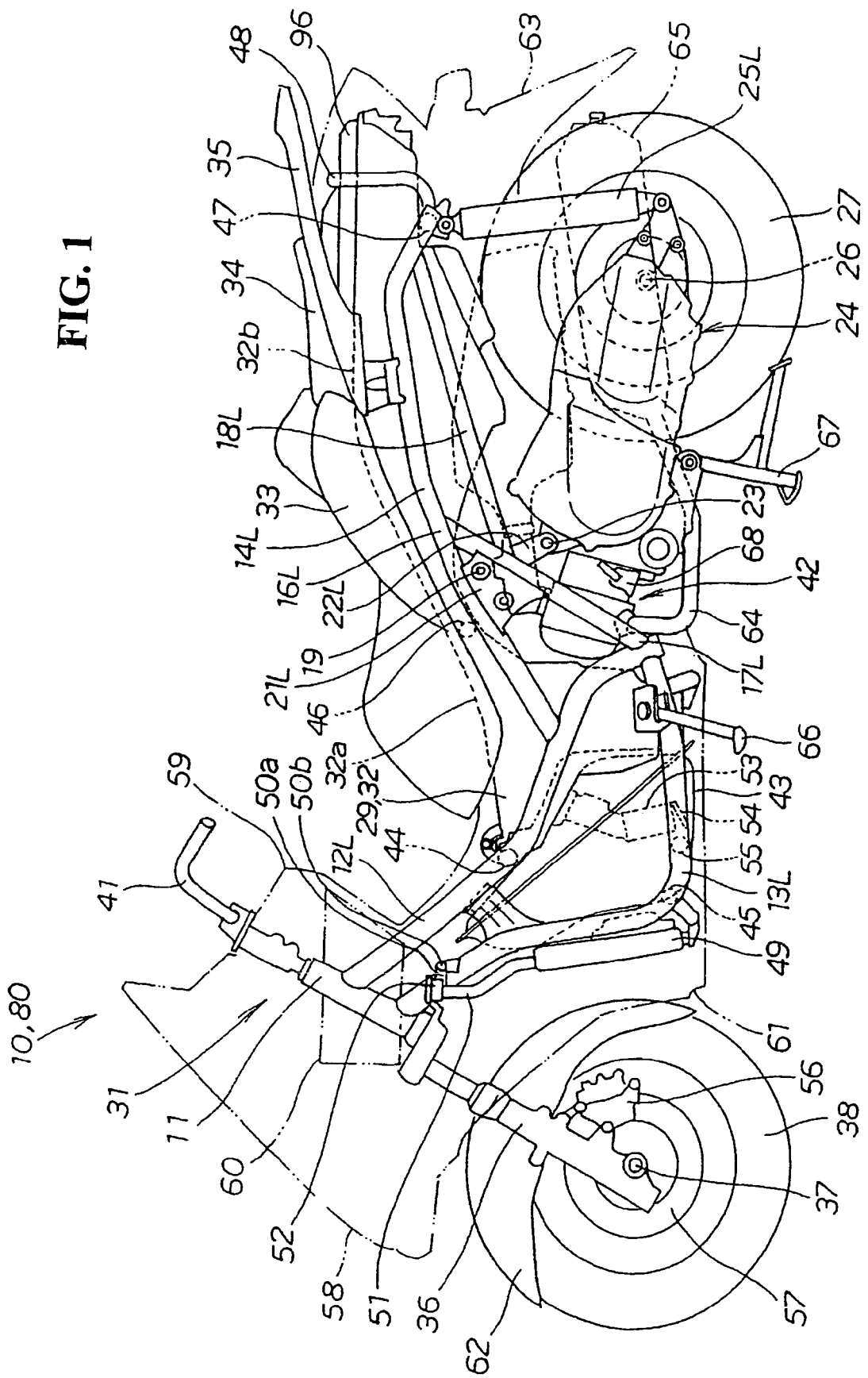
FIG. 1 is a left lateral view of a scooter type vehicle according to the present invention.

FIG. 1 is a left lateral view of a scooter type vehicle according to the present invention. A motorcycle 10 as the scooter type vehicle includes main frames 12L, 12R (only reference numeral 12L on the front side is shown) extending obliquely downward and rearward from the upper portion of a head pipe 11; and down frames 13L and 13R (only reference numeral 13L on the front side is shown) which extend obliquely downward and rearward from the lower portion of the head pipe 11, then extending approximately downwardly, lastly extending rearward, and is joined to the main frames 12L and 12R, respectively.

Additionally, motorcycle 10 includes seat rails 14L and 14R (only reference numeral 14L on the front side is shown) extending obliquely upward and rearward from the rear portions of the main frames 12L and 12R, respectively; middle frames 17L and 17R (only reference numeral 17L on the front side is shown) which connect the intermediate portions 16L and 16R (only reference numeral 16L on the front side is shown) of the seat rails 14L and 14R with the rear end portions of the main frames 12L and 12R, respectively; and rail stays 18L and 18R (only reference numeral 18L on the front side is shown) which connects the upper portions of the middle frames 17L and 17R with the rear portions of the seat rails 14L and 14R, respectively.

The motorcycle 10 also includes pivot plates 21L, 21R (only reference numeral 21L on the front side is shown) which are spanned between the seat rail 14L and the middle frame 17L and between the seat rail 14R and the middle frame 17R, respectively, and support a pivot shaft 19; and a link member 22L extending downward from the pivot plates 21L, 21R via the pivot shaft 19. The motorcycle 10 further includes a power unit 24 which extends rearward via the link member 22L and a support shaft 23 and also serves as up and down swingable rear swing arm; a rear cushion unit 25L spanned between the rear end portion of the power unit 24 and the seat rail 14L; a rear wheel axle 26 provided at the rear portion of the power unit 24 and serving as a drive shaft; and a rear wheel 27 attached to the rear wheel axle 26.

Further, motorcycle 10 includes a storage box 32 serving as a storage portion 29 mounted to the seat rails 14L, 14R constituting part of a body frame 31; a front seat 33 which covers a front portion 32a of the storage box 32 and on which a rider sits; a rear seat 34 which covers a rear portion 32b of the storage box 32 and on which a pillion passenger sits; and a rear spoiler 35 surrounding the rear seat 34. The motorcycle 10 further includes a front fork 36 steerably attached to the head pipe 11 located on the front portion thereof; a front wheel 38 attached to the front fork 36 via a front wheel axle 37; and a steering handlebar 41 attached to the upper end portion of the front fork 36. Incidentally, the power unit 24 includes a water-cooled engine 42.

A description of respective members spanned between the left and right frames is made below.

A fuel tank 43 is disposed in an area enclosed by the main frames 12L, 12R and down frames 13L, 13R. A first cross member 44 is located above the fuel tank 43 and spanned between the left and right main frames 12L, 12R. A second cross member 45 is located below the fuel tank 43 and spanned between the left and right down frames 13L, 13R. A third cross member 46 is located close to the pivot plates 21L, 21R and spanned between the left and right seat rails 14L, 14R. A rear cross member 47 is spanned between the rear end portions of the left and right seat rails 14L, 14R. Reference numeral 48 denotes a stay.

A radiator unit 49 is disposed rearward of the front wheel 38 and forward of the down frames 13L, 13R and adapted to cool the engine 42. A feed-water pipe 51 extends upward from the upper portion of the radiator unit 49 to feed water thereto. The nozzle of the fee-water pipe 51 is attached to the down frame 13L via a small stay 50a and a screw member 50b. A lid member 52 as a cap is detachably attached to the nozzle of the feed-water pipe 51.

The fuel tank 43 internally includes a fuel pump 53; a strainer 54 which is installed below the fuel pump 53 to separate foreign matter such as water, dust and the like from the fuel filled in the fuel tank 43; and a flow sensor 55 which detects the remaining amount of the fuel in the fuel tank 43.

FIG. 1 also shows a front disk brake unit 56, a front disk plate 57, a front cowl 58 covering the vehicle from the front, an inner cover 59, a main cowl 61 covering the vehicle from the side, a front fender 62, a rear fender 63, an exhaust pipe 64 extending from the power unit 24, a silencer 65 joined to the rear end of the exhaust pipe 65, a side stand 66, a main stand 67, and a secondary air reed valve 68. The inner cover 59 covers the front portion of the vehicle including the head pipe 11 and is provided continuously with the front cowl 58. The secondary air reed valve 68 is disposed laterally to the engine and connected to the exhaust pipe 64 and to an intake pipe 77 described later.

Figure 2:
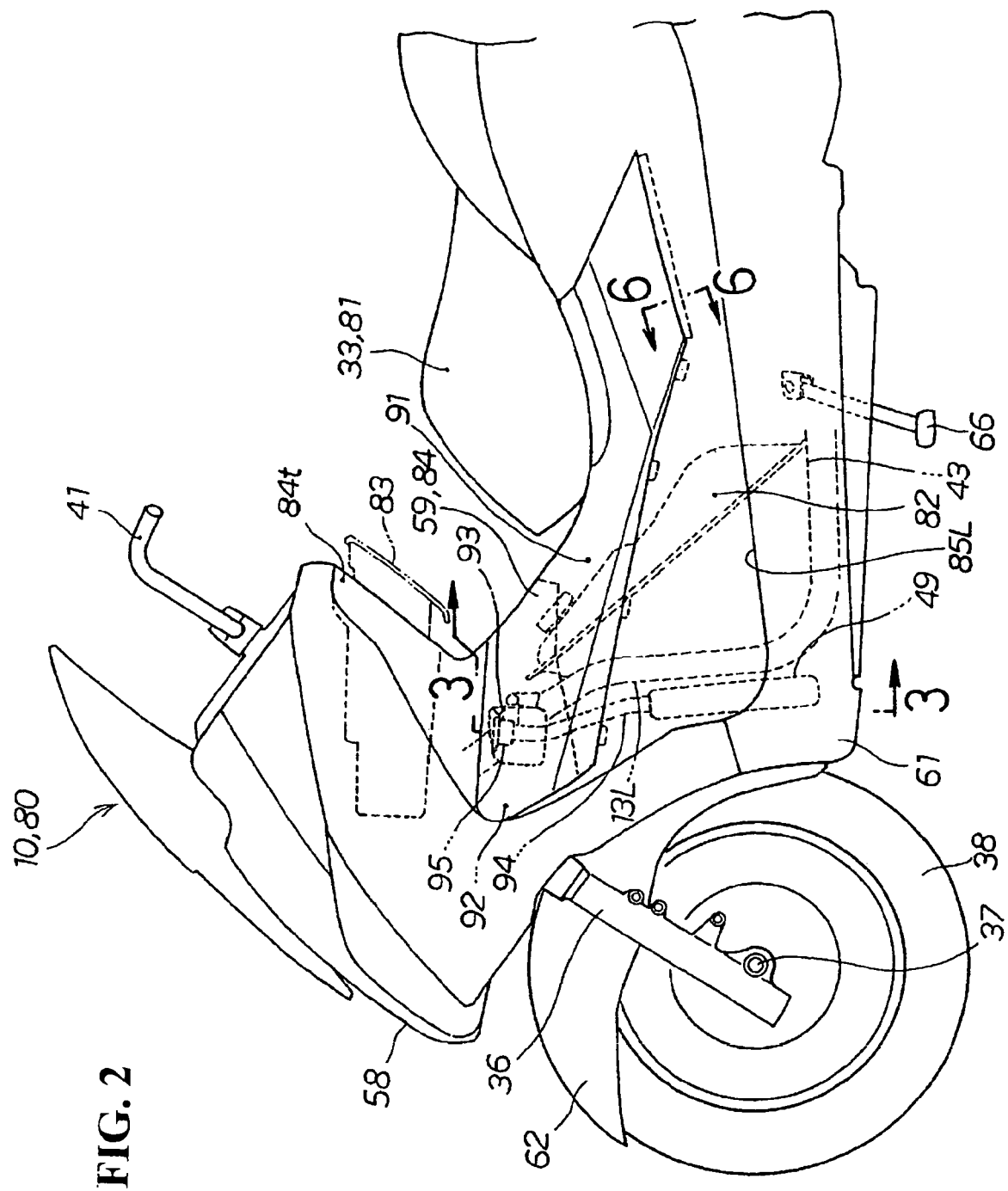
FIG. 2 is a left lateral view of a front portion of the scooter type vehicle according to the present invention.

FIG. 2 is a left lateral view illustrating the front portion of the scooter type vehicle according to the present invention. The scooter type vehicle 80 includes the steering handlebar 41 steered by a rider; a radiator 49 (the radiator unit 49) disposed under the front seat 33 or a seat 81 on which the rider sits and adapted to cool the cooling water of the engine; a step floor 82 which is disposed between the steering handlebar 41 and the seat 81 and on which the rider's feet are placed; and the inner cover 59 disposed forward of the step floor 82.

The inner cover 59 has an upper portion 84t protruding toward a rider and including a stuff box portion 83 (a stuff box 83) and serves to cover the feet of the rider sitting on the seat 81. In the following description the inner cover 59 is called the leg shield 84.

Figure 3:
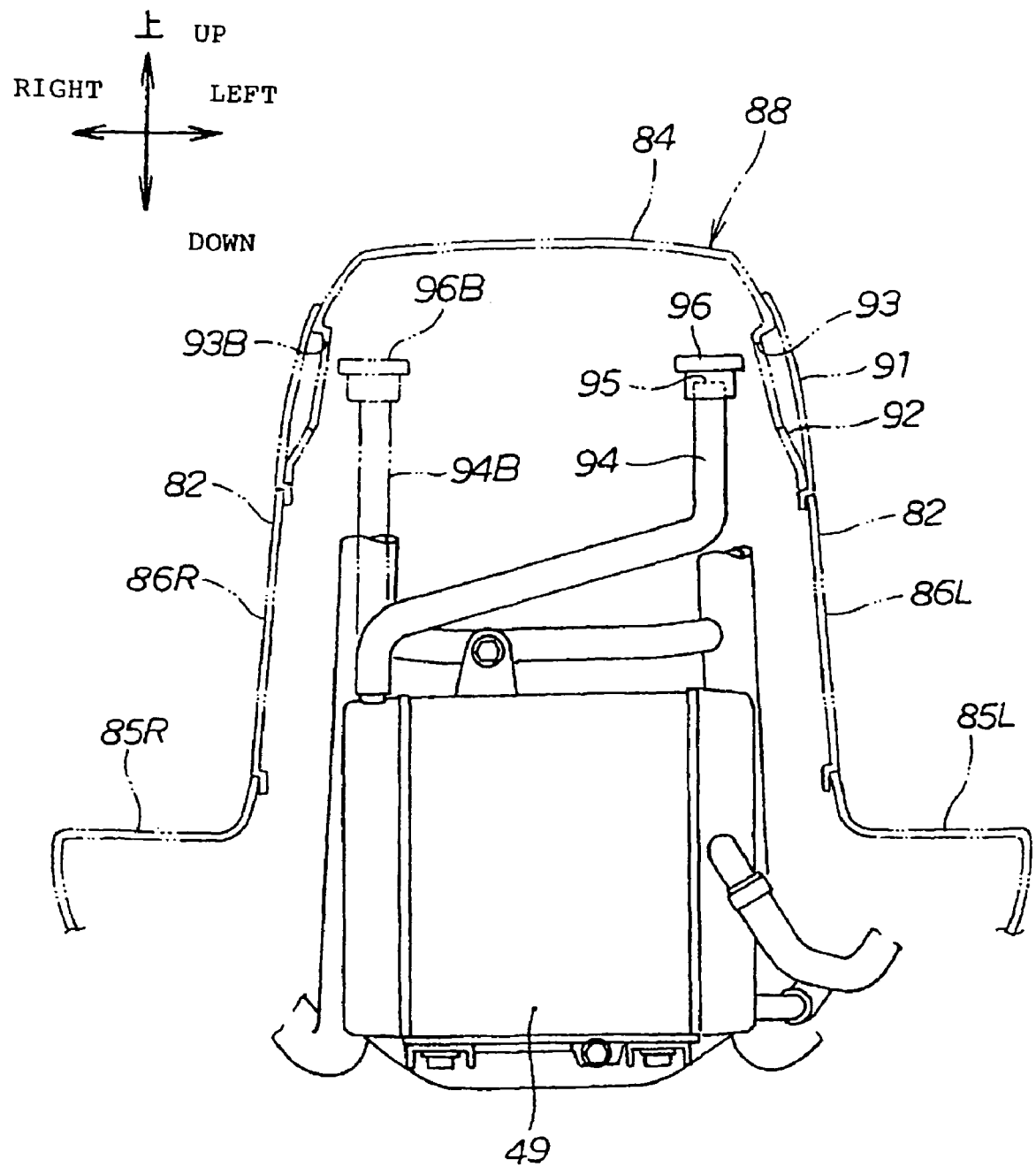
FIG. 3 is a cross-sectional view taken along line 3-3 of FIG. 2.

FIG. 3 is a cross-sectional view taking along line 3-3 of FIG. 2. The step floor 82 includes a pair of foot placing portions 85L, 85R on which the rider's feet are placed; and left and right lateral wall portions 86L, 86R joined to the foot placing portions 85L, 85R, respectively.

With reference to FIGS. 2 and 3, the leg shield 84 is disposed above the left and right lateral wall portions 86L, 86R of step floor 82. The leg shield 84 is provided with an opening portion 93 serving as a feed-water port for the radiator 49. The opening portion 93 is covered by a cover member 91 extending along a tunnel portion 88 in the back and forth direction of the vehicle body. The opening portion 93 is joined to one of the lateral wall portions of the tunnel portion 88 and disposed below the stuff box portion 83.

In other words, the opening portion 93 is provided in the lateral wall 92 of the leg shield 84 at a portion joined to the lateral wall portions 86L, 86R, and in a position that is below the stuff box portion 83. In addition, a feed-water nozzle 95 is disposed to face the opening portion 93. The feed-water nozzle 95 is connected via the feed-water pipe 94 to the radiator 49 and is adapted to feed cooling water thereto.

Of the left and right sides of the vehicle, the opening portion 93 is disposed on a side opposite to the side where the feed-water pipe 94 is connected to the radiator 49.

Alternatively, as can be seen in FIG. 3, an opening portion 93B may be disposed on the side where a feed-water pipe 94B is connected to the radiator 49 as shown with imaginary lines, whereby the length of the feed-water pipe 94B can further be reduced.

A lid member 96 is detachably attached to the feed-water nozzle 95 in such a manner that the lid member 96 can be taken out to the outside of the cover member 91 through the opening portion 93.

Since the lid member 96 is provided so that it can be taken out to the outside of the cover member 91 through the opening portion 93, the lid member 96 can be taken out to the outside of the cover member 91 when water is fed. Thus, the operation for feeding water into the radiator 49 can easily be carried out.

Figure 4:
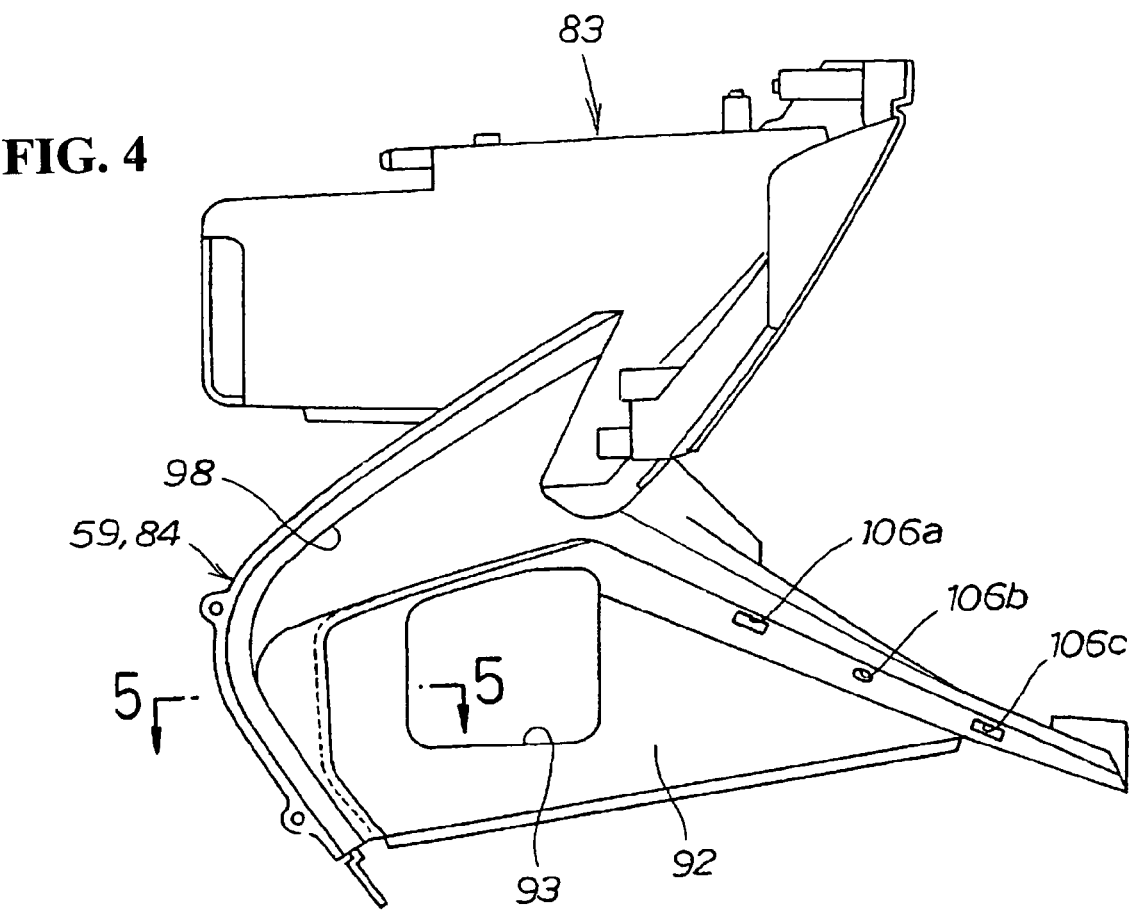
FIG. 4 is a lateral view of a leg shield attached to the vehicle front portion according to the present invention.

FIG. 4 is a lateral view of the leg shield 84 attached to the front portion of the vehicle according to the present invention. The leg shield 84 includes leg-covering portions 98 provided right and left to cover the legs of the rider; lateral walls 92 provided rearward of the leg-covering portions 98; and the stuff box portion 83 formed upward of and continuously with the right leg-covering portion 98. The lateral wall 92 is formed with the opening portion 93.

Figure 5:
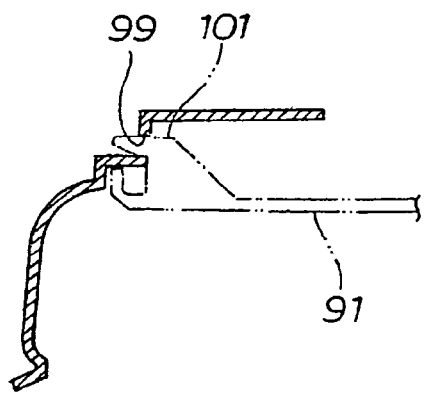
FIG. 5 is a cross-sectional view taken along line 5-5 of FIG. 4.

FIG. 5 is a cross-sectional view taken along line 5-5 of FIG. 4. The opening portion 93 bored in the lateral wall 92 is covered by the cover member 91 extending along the tunnel portion (see reference numeral 88 of FIG. 3) in the back and forth direction of the vehicle body.

An engaging hole 99 is formed forward of the opening portion 93 and an engaging portion 101 of the cover member 91 is configured to engage the engaging hole 99.

The opening portion 93 is covered by the cover member 91 extending along the tunnel portion 88 in the back and forth direction of the vehicle body; therefore, it can be suppressed that the external appearance of the vehicle is degraded by the opening portion 93.

Figure 6:
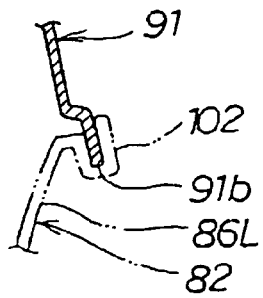
FIG. 6 is a cross-sectional view taken along line 6-6 of FIG. 2.

FIG. 6 is a cross-sectional view taken along line 6-6 of FIG. 2, illustrating a support structure for the cover member 91. The lateral wall portion 86L of the step floor 82 is provided with a receiving portion 102 formed in an approximately U-shape in cross-section. The cover member 91 is attached to the vehicle body side by inserting and fitting a lower end portion 91b of the cover member 91 into the receiving member 102. Incidentally, since the right-hand lateral wall portion 86R has the same structure as that of the left-hand lateral wall portion 86L, the description thereof is omitted.

Figure 7A:
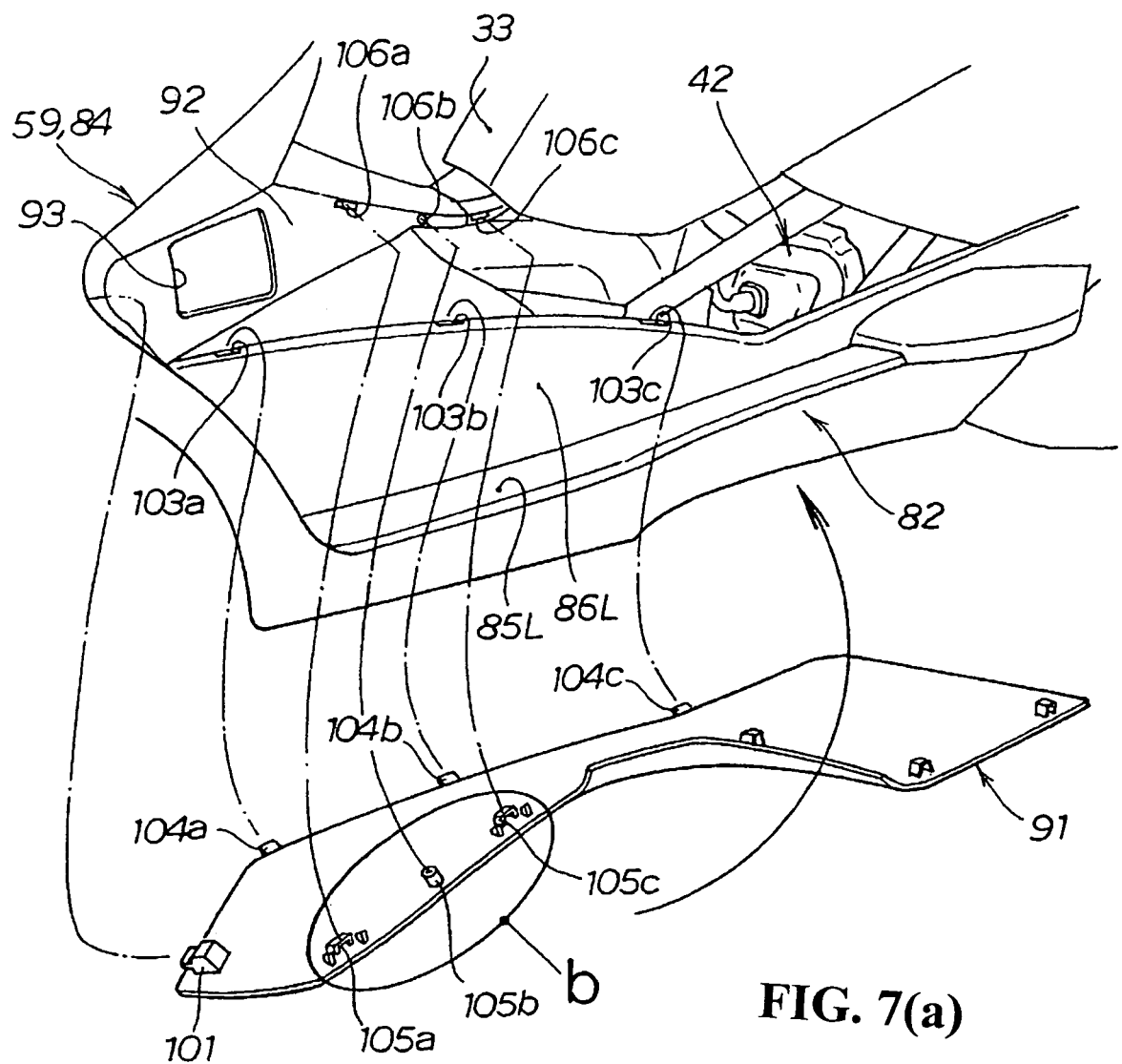
FIGS. 7(a) and 7(b) includes views for assistance in explaining a cover member engaging portion with the vehicle body side and the operation thereof according to the present invention.
Figure 7B:
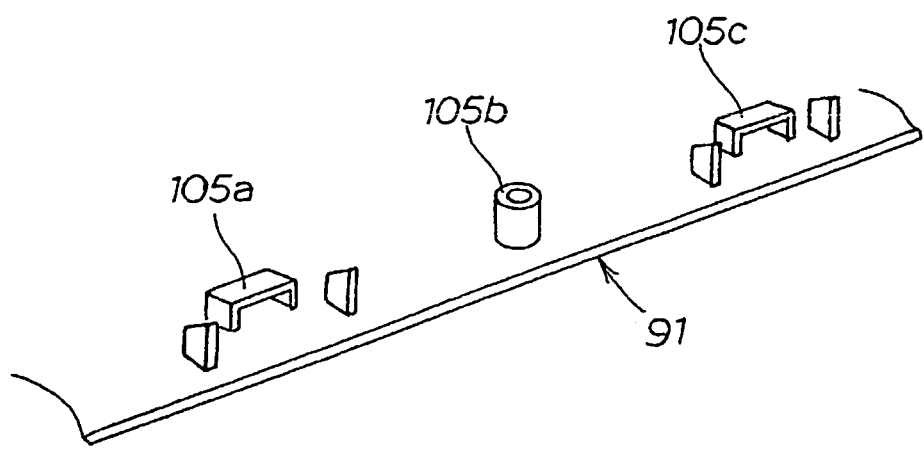

FIGS. 7(a) and 7(b) include views for assistance in explaining a cover member engaging portion with the vehicle body side and the operation thereof according to the present invention.

Referring to FIG. 7(a), the cover member 91 is provided at the lower side portion thereof with a first, a second and a third engaging claw 104a, 104b and 104c to be engaged with a first, a second and a third engaging groove 103a, 103b and 103c, respectively, formed in the step floor 82 of the vehicle body. Similarly, the cover member 91 is provided at the upper side portion thereof with a first, a second and a third engaging projection 105a, 105b and 105c to be engaged with locking holes 106a, 106b and 106c, respectively, formed in the lateral wall 92 of the leg shield 84.

The cover member 91 is attached to the lateral wall 92 of the leg shield 84 by inserting the first, second, third engaging claws 104a, 104b and 104c into the first, second and third engaging grooves 103a, 103b and 103c, respectively and fitting the engaging portion 101 to the engaging hole (reference numeral 99 in FIG. 5).

FIG. 7(b) is an enlarged view of a b-portion of FIG. 7(a), illustrating the configuration of the first through third engaging projections 105a through 105c provided on the cover member 91. The first and third engaging projections 105a, 105c are formed to have a shape different from that of the second engaging projection 105b. It is facilitated to identify the up-and-down direction of the cover member 91 to be attached to the lateral wall 92. Thus, the attachment operation of the cover member 91 can easily be carried out.

Figure 8:
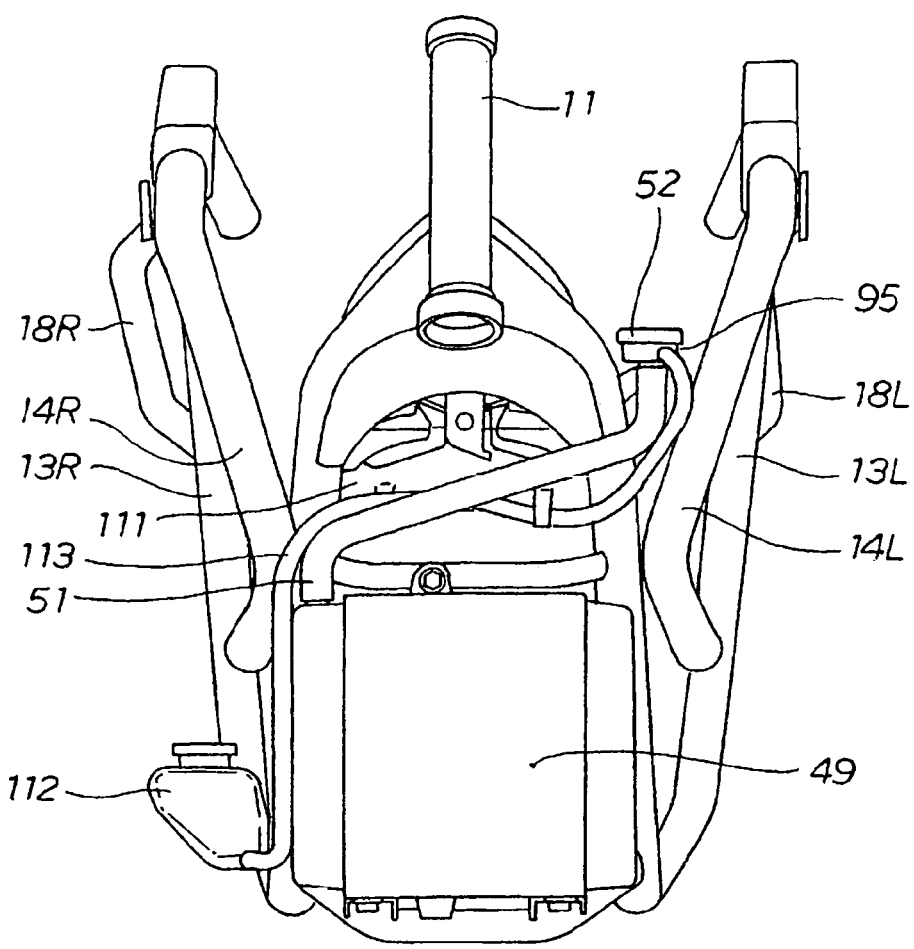
FIG. 8 is a view for assistance in explaining the configuration of the peripheral portion of a radiator of the scooter type vehicle according to the present invention.

FIG. 8 is a view for assistance in explaining the configuration of the peripheral portion of the radiator of the scooter type vehicle according to the present invention.

The fuel tank (reference numeral 43 of FIG. 1) is disposed rearward of the radiator 49. A fuel tank cover 111 is disposed to cover the fuel tank 43.

The fuel tank cover 111 is a member that is disposed between the radiator 49 and the fuel tank 43 and near the fuel tank 43 and covers the fuel tank 43 from the front thereof.

A hose 113 is arranged to extend between the feed-water nozzle 95 and a reservoir tank 112 and connect them and supported by the fuel tank cover 111. The reservoir tank 112 is adapted to store cooling water for the engine (reference numeral 42 of FIG. 1) mounted on the vehicle body. In addition, the reservoir tank 112 is disposed on a side different from the side of the feed-water nozzle 95.

The hose 113 connecting the feed-water nozzle 95 with the reservoir tank is disposed rearward of the radiator 49 and supported by the fuel tank cover 111. Therefore, a dedicated support member can be eliminated. Since the dedicated support member is eliminated, an increase in number of component parts can be suppressed.

Figure 9:
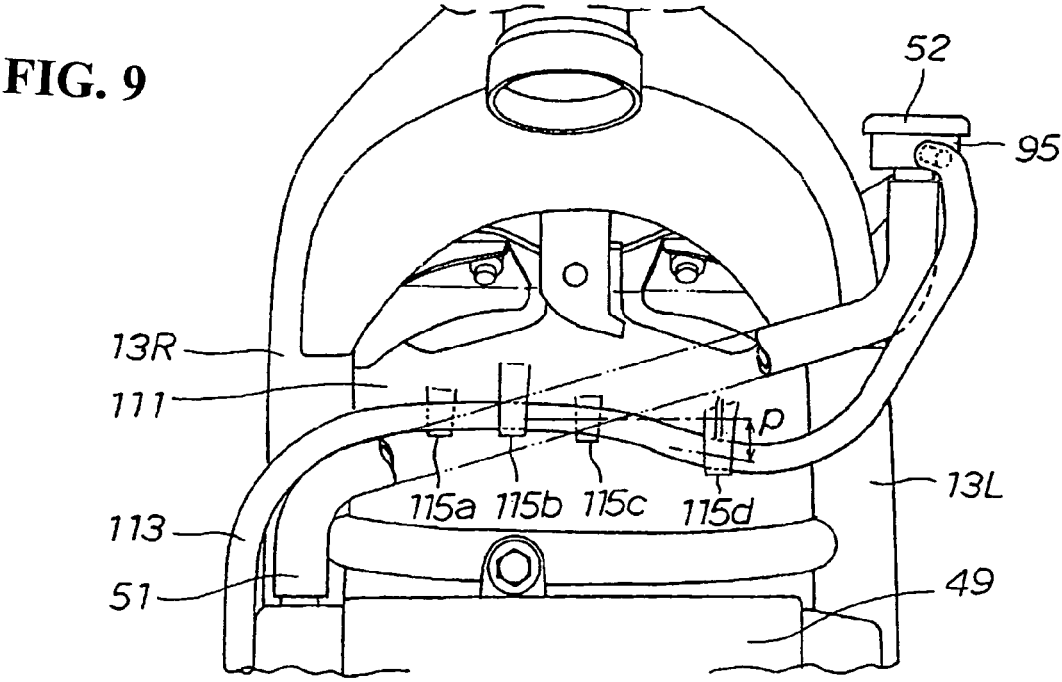
FIG. 9 is a view for assistance in explaining a support structure for a hose provided for a fuel tank cover.
Figure 10:
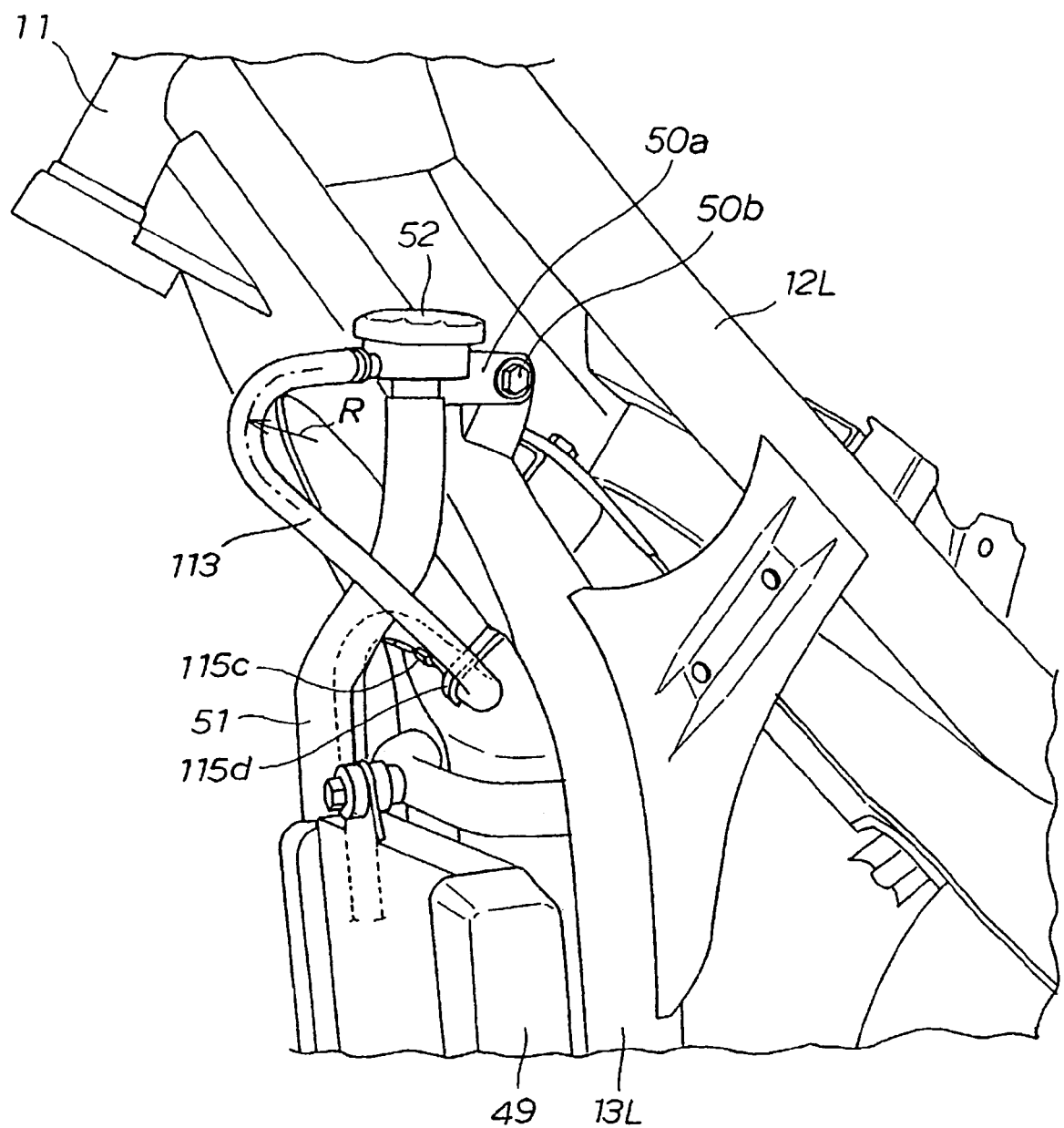
FIG. 10 is a perspective view of the vehicle body front portion, illustrating the layout of the hose connecting a reservoir tank with a feed-water nozzle according to the present invention.

FIG. 9 is a view for assistance in explaining a support structure for the hose provided for the fuel tank cover. FIG. 10 is a perspective view of a vehicle body front portion, illustrating the layout of the hose connecting the reservoir tank with the feed-water nozzle 95 according to the present invention. A description is made below with reference to FIGS. 9 and 10.

The fuel tank cover 111 is provided for the fuel tank (reference numeral 43 in FIG. 1) and the hose 113 is provided on the fuel tank cover 111 so as to be supportable at a preferable position thereon. This makes it possible to increase the flexibility of layout of the hose 113 extending between the feed-water nozzle 95 and the reservoir tank 112.

The hose 113 is supported by the fuel tank cover 111 at a plurality of positions in a vehicle-width direction. Among a plurality of support portions 115a through 115d supporting the hose 113, the support portion 115d close to the feed-water nozzle 95 is offset downward from the other supporting portions 115a to 115c by a distance of "p", thus increasing the curvature radius R of the hose 113.

The increased curvature radius R of the hose 113 can make it difficult to apply a strong force to the hose 113, thereby enhancing the durability of the hose 113.

Incidentally, the support portion 115d close to the feed-water nozzle 95 may be offset upward from the other support portions 115a to 115c.

Next, a description is provided of the operation of the scooter type vehicle provided with the radiator described above. Referring again to FIG. 2, the lateral wall 92 of the leg shield 84, which is a portion joined to the lateral wall portions 86L, 86R of the step floor 82, is provided with the opening portion 93 that the feed-water nozzle 95 of the radiator 49 faces.

Since the feed-water nozzle 95 of the radiator 49 is made to face the opening portion 93, it is possible to feed water without removal of the stuff box portion 83. Since it is possible to feed water into the radiator 49 without removal of the stuff box portion 83, maintenance performance for the radiator 49 can be enhanced.

In addition, since the lateral wall 92 is provided with the opening portion 93, it is not necessary to extend the feed-water pipe 94 for the radiator 49 to the position of the stuff box portion 83 provided at the upper portion of the leg shield 84. That is to say, since it is not necessary to extend the feed-water pipe 94 for the radiator 49 to the upper portion of the leg shield 84, the length of the feed-water pipe 94 can be reduced while effectively utilizing the dead space of the vehicle.

With reference to FIGS. 1 to 3, the scooter type vehicle 80 is provided with the side stand 66 and the opening portion 93 is disposed on the side where the side stand 66 is provided. If water is fed with the vehicle inclined by use of the side stand 66, a rider can look at the feed-water nozzle 95 from the oblique upside. This makes it easy to visibly recognize the feed-water nozzle 95, further enhancing the maintenance performance for the radiator 49.

Figure 11:
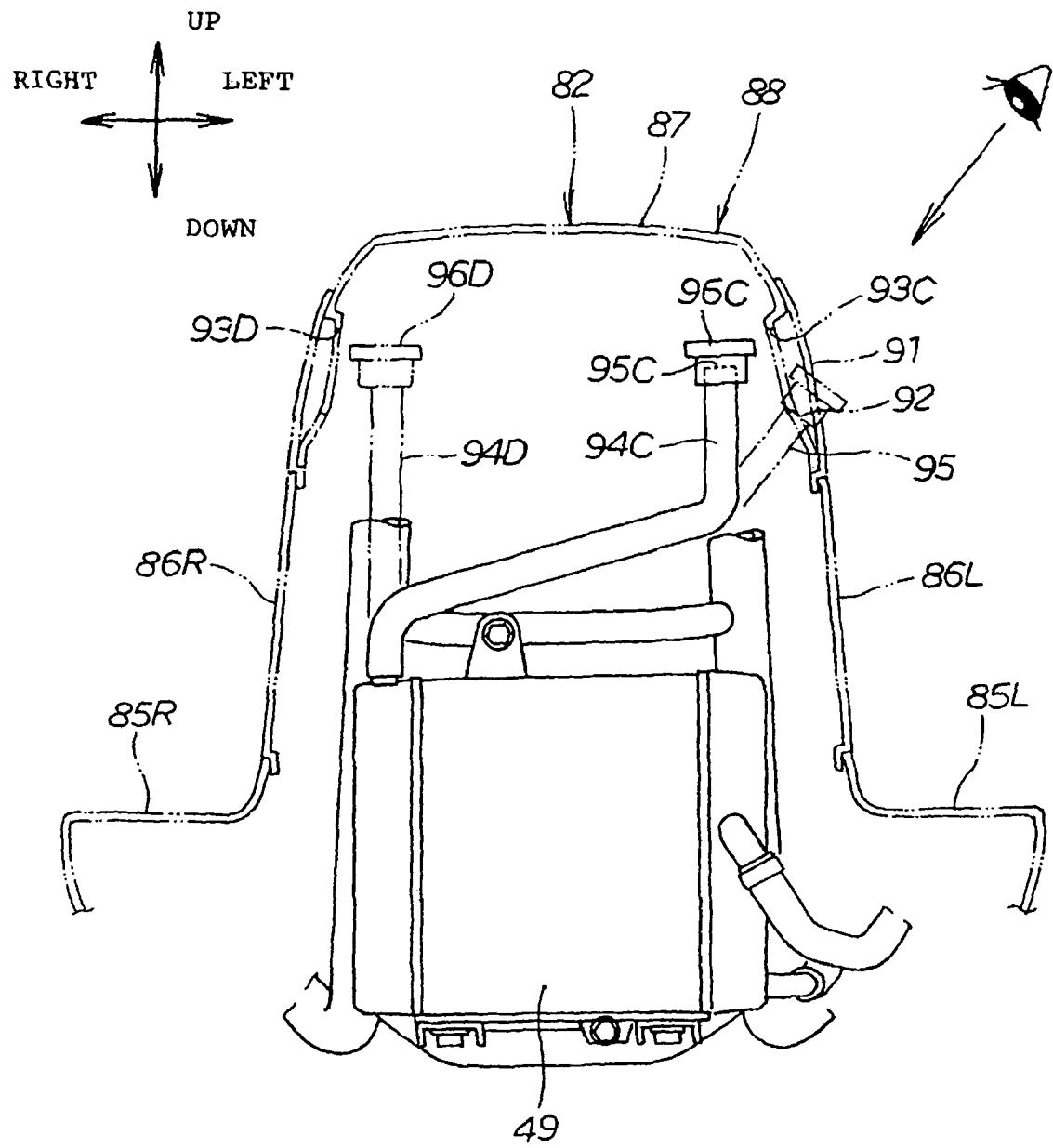
FIG. 11 illustrates another embodiment corresponding to the embodiment shown in FIG. 2.

FIG. 11 illustrates another embodiment corresponding to the embodiment shown in FIG. 2. A description is made of a case where an opening portion 93C is provided at a tunnel portion 88 of a step floor 82 provided rearward of a leg shield 84.

The step floor 82 includes a pair of foot placing portions 85L, 85R on which rider's feet are placed; and the tunnel portion 88. The tunnel portion 88 is formed, to protrude upward, by left and right lateral wall portions 86L and 86R joined respectively to the left and right foot placing portions 85L, 85R and an upper wall 87 joining together the left and right lateral wall portions 86L, 86R.

The left lateral wall portion 86L is provided with the opening portion 93C as the feed-water nozzle 95 for the radiator 49. The opening portion 93C is covered by a cover member 91 extending in the back and forth direction of the vehicle body along the lateral wall 92 of the leg shield 84 joined to the tunnel portion 88.

The opening portion 93C is provided at the lateral wall 92 of the leg shield 84 which is a portion joined to the lateral wall portions 86L, 86R and located below the stuff box portion 83. A feed-water nozzle 95C which is connected to the radiator 49 via a feed-water pipe 94C and adapted to feed cooling water is made to face the opening portion 93C.

The opening portion 93C is disposed on a side opposite to the side where the feed-water pipe 94C is connected to the radiator 49, of the left and right sides of the vehicle.

Alternatively, an opening portion 93D may be disposed on the side where a feed-water pipe 94D is connected to the radiator 49, as shown with imaginary lines, whereby the length of the feed-water pipe 94D can further be reduced.

A lid member 96C is detachably attached to the feed-water nozzle 95C in such a manner that the lid member 96C and feed-water nozzle 95C can be taken out to the outside of the cover member 91 through the opening portion 93C. Specifically, since the feed-water pipe 94C is made of hard rubber, it can be taken out to the outside of the cover member 91 during maintenance.

Since the feed-water nozzle 95C and the lid member 96C are provided so that they can be taken out to the outside of the cover member 91 through the opening portion 93C, the opening portion 93C can visibly be recognized with ease, so that operation for feeding water into the radiator 49 can easily be carried out.

Figure 12:
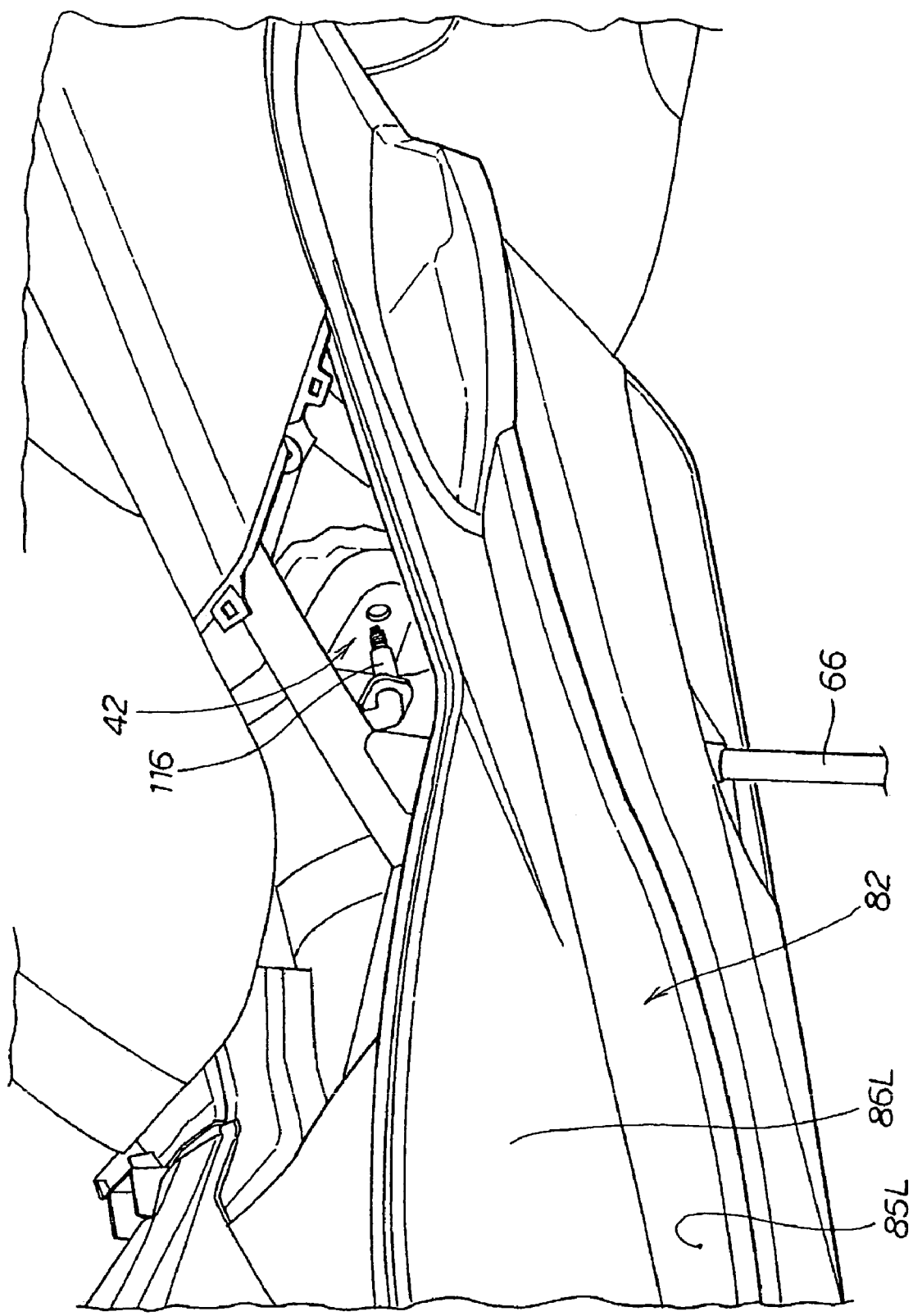
FIG. 12 is a perspective for assistance in explaining the fact that maintenance for an engine can be enabled by removing a cover member from the vehicle body side.

FIG. 12 is a perspective view for assistance in explaining the fact that maintenance for the engine can be enabled by removing the cover member from the vehicle body side. In the figure, reference numeral 116 denotes an ignition plug detachably attached to the engine 42.

The cover member (reference numeral 91 in FIG. 2) detached from the vehicle body side also serves as a maintenance lid for the engine 42; therefore, a dedicated maintenance lid is eliminated. Since the dedicated maintenance lid is eliminated, an increase in number of component parts can be suppressed.

Incidentally, the opening portion may not be disposed on the side where the feed-water pipe is connected to the radiator, of the left and right sides of the vehicle. For example, the opening portion may be disposed on a side opposite to the side where the feed-water pipe is connected to the radiator, of the left and right sides of the vehicle.

In addition, the opening portion may not be disposed on the side where the side stand is provided. For example, the opening portion may be disposed on a side opposite to the side where the side stand is provided.

The present invention is suitable for a scooter type vehicle provided with a radiator for cooling the cooling water of a water-cooled engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scooter vehicle comprising:
   a radiator disposed below and between a steering handlebar steered by a rider and a seat on which the rider sits and adapted to cool cooling water of a water-cooled engine;
   a step floor which is disposed between the steering handlebar and the seat and on which feet of the rider are placed; and
   a leg shield disposed forward of the step floor, having an upper portion protruding toward a side of the rider and including a stuff box, and shielding the legs of the rider sitting on the seat;
   wherein the step floor includes:
      a pair of left and right foot placing portion on which the rider's feet are placed, and a tunnel portion,
      wherein the tunnel portion is formed by left and right lateral wall portions joined respectively to the left and right foot placing portion and an upper wall connecting the left and right lateral wall portions,
      wherein one of the lateral wall portions or a portion joined to the one of the lateral wall portions is provided with an opening portion disposed in a position below the stuff box, and
      wherein a feed-water nozzle connected to the radiator via a feed-water pipe and adapted to feed water to the radiator is disposed to face the opening portion.

2. The scooter vehicle according to claim 1, wherein the opening portion is covered by a cover member extending along the tunnel portion in a back and forth direction of a vehicle body.

3. The scooter vehicle according to claim 1, wherein a lid member is detachably attached to the feed-water nozzle and can be taken out to an outside of the cover member through the opening portion.

4. The scooter vehicle according to claim 2, wherein a lid member is detachably attached to the feed-water nozzle and can be taken out to the outside of the cover member through the opening portion.

5. The scooter vehicle according to claim 1, wherein the opening portion is disposed on one of the left and right sides of the vehicle where the feed-water pipe is connected to the radiator.

6. The scooter vehicle according to claim 2, wherein the opening portion is disposed on one of the left and right sides of the vehicle where the feed-water pipe is connected to the radiator.

7. The scooter vehicle according to claim 3, wherein the opening portion is disposed on one of the left and right sides of the vehicle where the feed-water pipe is connected to the radiator.

8. The scooter vehicle according to claim 1, further comprising a side stand, wherein the opening portion is disposed on a side where the side stand is provided.

9. The scooter vehicle according to claim 2, further comprising a side stand, wherein the opening portion is disposed on a side where the side stand is provided.

10. The scooter vehicle according to claim 1, wherein a fuel tank is provided rearward of the radiator, a fuel tank cover is provided for the fuel tank, a hose is provided to connect the feed-water nozzle with a reservoir tank for storing the cooling water for the engine mounted on a vehicle body, and the hose is supported by the fuel tank cover.

11. The scooter vehicle according to claim 2, wherein a fuel tank is provided rearward of the radiator, a fuel tank cover is provided for the fuel tank, a hose is provided to connect the feed-water nozzle with a reservoir tank for storing the cooling water for the engine mounted on a vehicle body, and the hose is supported by the fuel tank cover.

12. The scooter vehicle according to claim 10, wherein the reservoir tank is disposed on a side different from the side of the feed-water nozzle, the hose is supported by the fuel tank cover at a plurality of positions in a vehicle-width direction and a curvature radius of the hose is increased by allowing a support portion close to the feed-water pipe to be offset upward or downward from the other support portions.

13. The scooter vehicle according to claim 2, wherein the cover member also serves as a maintenance lid for the engine.

14. A scooter vehicle comprising:
a radiator disposed below and between a steering handlebar steered by a rider and a seat on which the rider sits and adapted to cool cooling water of a water-cooled engine;
step floor which is disposed between the steering handlebar and the seat and on which feet of the rider are placed; and
a leg shield disposed forward of the step floor and adapted to shield the legs of the rider sitting on the seat, the leg shield having an upper portion protruding toward a side of the rider and including a stuff box, an upper wall, left and right lateral walls, and an opening in one of the lateral walls,
wherein the step floor includes left and right foot placing portions on which the rider's feet are placed, and left and right lateral wall portions extending upwardly from the left and right foot placing portions,
wherein the tunnel portion is formed by the left and right lateral wall portions joined respectively to the left and right foot placing portion of the step floor, and the left and right lateral wall portions and upper wall of the leg shield,
wherein one of the left and right lateral walls of the leg shield is provided with an opening portion disposed in a position below the stuff box, and
wherein a feed-water nozzle connected to the radiator via a feed-water pipe and adapted to feed water to the radiator is disposed to face the opening portion.

15. The scooter vehicle according to claim 14, wherein the opening portion is covered by a cover member extending along the tunnel portion in a back and forth direction of a vehicle body.

16. The scooter vehicle according to claim 14, wherein a lid member is detachably attached to the feed-water nozzle and can be taken out to an outside of the cover member through the opening portion.

17. The scooter vehicle according to claim 14, wherein the opening portion is disposed on one of the left and right sides of the vehicle where the feed-water pipe is connected to the radiator.

18. The scooter vehicle according to claim 14, further comprising a side stand, wherein the opening portion is disposed on a side where the side stand is provided.

19. The scooter vehicle according to claim 14, wherein a fuel tank is provided rearward of the radiator, a fuel tank cover is provided for the fuel tank, a hose is provided to connect the feed-water nozzle with a reservoir tank for storing the cooling water for the engine mounted on a vehicle body, and the hose is supported by the fuel tank cover.

20. The scooter vehicle according to claim 19, wherein the reservoir tank is disposed on a side different from the side of the feed-water nozzle, the hose is supported by the fuel tank cover at a plurality of positions in a vehicle-width direction and a curvature radius of the hose is increased by allowing a support portion close to the feed-water pipe to be offset upward or downward from the other support portions.

* * * * *